United States Patent
Sak et al.

(10) Patent No.: US 9,594,744 B2
(45) Date of Patent: Mar. 14, 2017

(54) SPEECH TRANSCRIPTION INCLUDING WRITTEN TEXT

(71) Applicant: Google Inc., Mountain View, CA (US)

(72) Inventors: Hasim Sak, New York, NY (US); Francoise Beaufays, Mountain View, CA (US)

(73) Assignee: Google Inc., Mountain View, CA (US)

(*) Notice: Subject to any disclaimer, the term of this patent is extended or adjusted under 35 U.S.C. 154(b) by 164 days.

(21) Appl. No.: 13/829,482

(22) Filed: Mar. 14, 2013

(65) Prior Publication Data

US 2014/0149119 A1  May 29, 2014

Related U.S. Application Data

(60) Provisional application No. 61/730,744, filed on Nov. 28, 2012.

(51) Int. Cl.
| | |
|---|---|
| *G06F 17/27* | (2006.01) |
| *G10L 15/00* | (2013.01) |
| *G10L 15/14* | (2006.01) |
| *G10L 15/08* | (2006.01) |
| *G10L 15/26* | (2006.01) |
| *G10L 15/187* | (2013.01) |
| *G10L 15/197* | (2013.01) |

(52) U.S. Cl.
CPC ........ *G06F 17/2775* (2013.01); *G10L 15/083* (2013.01); *G10L 15/187* (2013.01); *G10L 15/197* (2013.01); *G10L 15/26* (2013.01)

(58) Field of Classification Search
CPC ... G10L 15/183; G10L 15/187; G10L 15/193; G10L 15/14; G10L 15/18
USPC .................................................. 704/231–256
See application file for complete search history.

(56) References Cited

U.S. PATENT DOCUMENTS

| | | | | |
|---|---|---|---|---|
| 5,594,641 | A | * | 1/1997 | Kaplan et al. |
| 5,806,032 | A | * | 9/1998 | Sproat ........................... 704/255 |
| 6,032,111 | A | * | 2/2000 | Mohri ............................... 704/9 |
| 6,249,761 | B1 | * | 6/2001 | Phillips et al. ................ 704/231 |
| 6,574,597 | B1 | * | 6/2003 | Mohri et al. .................. 704/251 |
| 8,346,555 | B2 | * | 1/2013 | Metz ............................. 704/257 |
| 8,914,286 | B1 | * | 12/2014 | Secker-Walker et al. .... 704/244 |

(Continued)

OTHER PUBLICATIONS

Riley, Michael, Fernando Pereira, and Mehryar Mohri. "Transducer composition for context-dependent network expansion." EUROSPEECH. 1997.*

(Continued)

*Primary Examiner* — Michael Ortiz Sanchez
(74) *Attorney, Agent, or Firm* — Fish & Richardson P.C.

(57) ABSTRACT

Methods, systems, and apparatus, including computer programs encoded on a computer storage medium, for transcribing utterances into written text are disclosed. The methods, systems, and apparatus include actions of obtaining a lexicon model that maps phones to spoken text and obtaining a language model that assigns probabilities to written text. Further includes generating a transducer that maps the written text to the spoken text, the transducer mapping multiple items of the written text to an item of the spoken text. Additionally, the actions include constructing a decoding network for transcribing utterances into written text, by composing the lexicon model, the inverse of the transducer, and the language model.

20 Claims, 5 Drawing Sheets

(56) References Cited

U.S. PATENT DOCUMENTS

| | | | |
|---|---|---|---|
| 2002/0091512 A1* | 7/2002 | Karttunen et al. | 704/202 |
| 2003/0009331 A1* | 1/2003 | Schalkwyk et al. | 704/237 |
| 2004/0088163 A1* | 5/2004 | Schalkwyk | 704/251 |
| 2006/0015336 A1* | 1/2006 | Parthasarathy | 704/235 |
| 2008/0294437 A1* | 11/2008 | Nakano et al. | 704/251 |
| 2009/0259629 A1* | 10/2009 | Wei | G06F 17/30672 |
| 2010/0185448 A1* | 7/2010 | Meisel | 704/256.1 |
| 2010/0332231 A1* | 12/2010 | Nakano et al. | 704/254 |
| 2012/0143591 A1* | 6/2012 | Deng et al. | 704/2 |
| 2012/0191449 A1* | 7/2012 | Lloyd et al. | 704/231 |
| 2012/0245934 A1* | 9/2012 | Talwar et al. | 704/235 |
| 2012/0290299 A1* | 11/2012 | Basson | G10L 15/063 704/235 |

OTHER PUBLICATIONS

Knight, Kevin, and Jonathan Graehl. "An overview of probabilistic tree transducers for natural language processing." International Conference on Intelligent Text Processing and Computational Linguistics. Springer Berlin Heidelberg, 2005.*

Allauzen, Cyril et al., "Generalized Algorithms for Construction Statistical Language Models," Proceedings of the 41st Annual Meeting of the Association for Computational Linguistics, Jul. 2003, 8 pages.

Allauzen, Cyril et al., "A Generalized Composition Algorithm for Weighted Finite-State Transducers," Interspeech 2009, 4 pages.

Allauzen, Cyril et al., "OpenFst: A General and Efficient Weighted Finite-State Transducer Library," CIAA 2007 Proceedings of the 12th International Conference on Implementation and Application of Automata, 13 pages.

Brown, Peter F. et al., "Class-Based η-gram Models of Natural Language," 1992 Association for Computational Linguistics, 13 pages.

Chelba, C. et al., "Query Language Modeling for Voice Search," Spoken Language Technology Workshop, 2010 IEEE, 6 pages.

Mohri, Mehryar et al., "Full Expansion of Context-Dependent Networks in Large Vocabulary Speech Recognition," Proceedings of the 1998 IEEE International Conference on Acoustics, Speech and Signal Processing, (vol. 2) 4 pages.

Mohri, Mehryar et al., "Integrated Context-Dependent Networks in Very Large Vocabulary Speech Recognition," Proceedings of the 6th European Conference on Speech Communication and Technology, 1999, 4 pages.

Mohri, Mehryar et al., "An Efficient Compiler for Weighted Rewrite Rules," 34th Annual Meeting of the Association for Computational Linguistics, 1996, 8 pages.

Povey, Daniel et al., "Boosted MMI for Model and Feature-Space Discriminative Training," IEEE International Conference on Acoustics, Speech and Signal Processing, 2008, 4 pages.

Roark, Brian, et al. "The OpenGrm Open-Source Finite-State Grammar Software Libraries," Proceedings of the 50th Annual Meeting of the Association for Computational Linguistics, pp. 61-66, Jeju, Republic of Korea, Jul. 8-14, 2012, 6 pages.

Sak, Hasim et al., "Language Model Verbalization for Automatic Speech Recognition," IEEE International Conference on Acoustics, Speech and Signal Processing, 2013, 5 pages.

Shugrina, Maria, "Formatting Time-Aligned ASR Transcripts for Readability," Human Language Technologies: The 2010 Annual Conference of the North American Chapter of the ACL, pp. 198-206, Los Angeles, California, Jun. 2010, 9 pages.

International Search Report and Written Opinion in International Application No. PCT/US2013/068908, mailed Mar. 13, 2014, 12 pages.

International Preliminary Report on Patentability in International Application No. PCT/US2013/068908, mailed Jun. 11, 2015, 8 pages.

* cited by examiner

SPEECH TRANSCRIPTION INCLUDING WRITTEN TEXT

CROSS-REFERENCE TO RELATED APPLICATIONS

This application claims the benefit of U.S. Provisional Patent Application No. 61/730,744, filed Nov. 28, 2012, the entirety of which is hereby incorporated by reference as if fully set forth therein.

TECHNICAL FIELD

This disclosure generally relates to speech transcription.

BACKGROUND

Automatic speech recognition (ASR) may be used to transcribe spoken language into written language. However, transcriptions by an ASR may be incorrect or lack formatting information.

SUMMARY

In general, an aspect of the subject matter described in this specification may involve a process for transcribing utterances of a spoken language into written text. Written text may be a textual representation of a written language.

Written text may include lexical and non-lexical items. Non-lexical items may be text that is not written as words, e.g., non-verbal entities, numeric entities, dates, times, abbreviations and acronyms. Lexical items may be text that is written with words. For example, "TEN" may be a lexical item and "10" may be a non-lexical item.

Written text may be differentiated from spoken text, which may be a textual representation of a spoken language and may include only lexical items. For example, the written text "10 WALL ST." may correspond to the spoken text "TEN WALL STREET," which is also written text.

Transcribing utterances of a spoken language into written text presents some challenges for ASR systems. For example, an utterance in the spoken English language corresponding to the address "10 WALL ST." may be transcribed as the spoken text "TEN WALL STREET" instead of the written text "10 WALL ST." The difficulty may arise from conversion ambiguity between spoken and written language. Transcription between non-lexical items and lexical items may be particularly ambiguous. For example, the "STREET" may be transcribed as both the lexical item "STREET" and the non-lexical item "ST."

For transcription into written text, a system may expand an item of spoken text into multiple items of written text, e.g., transcribe an utterance into alternative forms of written text. To transcribe the utterance into alternative forms of written text, the system may use the inverse of a transducer that expands written text to alternative forms of spoken text, e.g., the transducer maps "10" to "ten" and "ten" to "ten," and the inverse of the transducer expands "ten" into "10" and "ten." The system may then select a transcription from the multiple items of written text based on a language model that assigns probabilities to written text. The probabilities may represent the likelihood that an item of written text is a correct transcription.

In some aspects, the subject matter described in this specification may be embodied in methods that include the actions of obtaining a lexicon model that maps phones to spoken text and obtaining a language model that assigns probabilities to written text. Further actions include generating a transducer that maps the written text to the spoken text. The transducer maps multiple items of the written text to an item of the spoken text. Additionally, the actions include constructing a decoding network for transcribing utterances into written text, by composing the lexicon model, the inverse of the transducer, and the language model.

Other versions include corresponding systems, apparatus, and computer programs, configured to perform the actions of the methods, encoded on computer storage devices.

These and other versions may each optionally include one or more of the following features. For instance, some implementations involve obtaining an utterance of a user and transcribing the utterance to an item of the written text using the decoding network.

In certain aspects, the spoken text includes a textual representation of a spoken language. In some aspects, the written text includes a textual representation of a written language.

In some implementations, generating the transducer includes obtaining grammar rules for expanding the written text into the spoken text, generating expansions of the written text into spoken text using the grammar rules, and adding the expansions to the transducer.

In other aspects, obtaining the language model includes obtaining spoken text of the language model, generating written text from the spoken text of the language model using the transducer, and adding the generated written text to the language model.

In additional aspects, obtaining the lexicon model includes obtaining a context dependency model mapping context dependent phones to context independent phones, obtaining a pronunciation lexicon mapping sequences of the context independent phones to the spoken text, and constructing the lexicon model by composing the context dependency model and the pronunciation lexicon.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

It may be desirable for automatic speech recognition (ASR) systems to transcribe utterances of a spoken language into written text of a written language. For example, a voice enabled map search application may return better results when transcribing an utterance of an address of "10 WALL ST." as "10 WALL ST." instead of "TEN WALL STREET."

Figure 1:
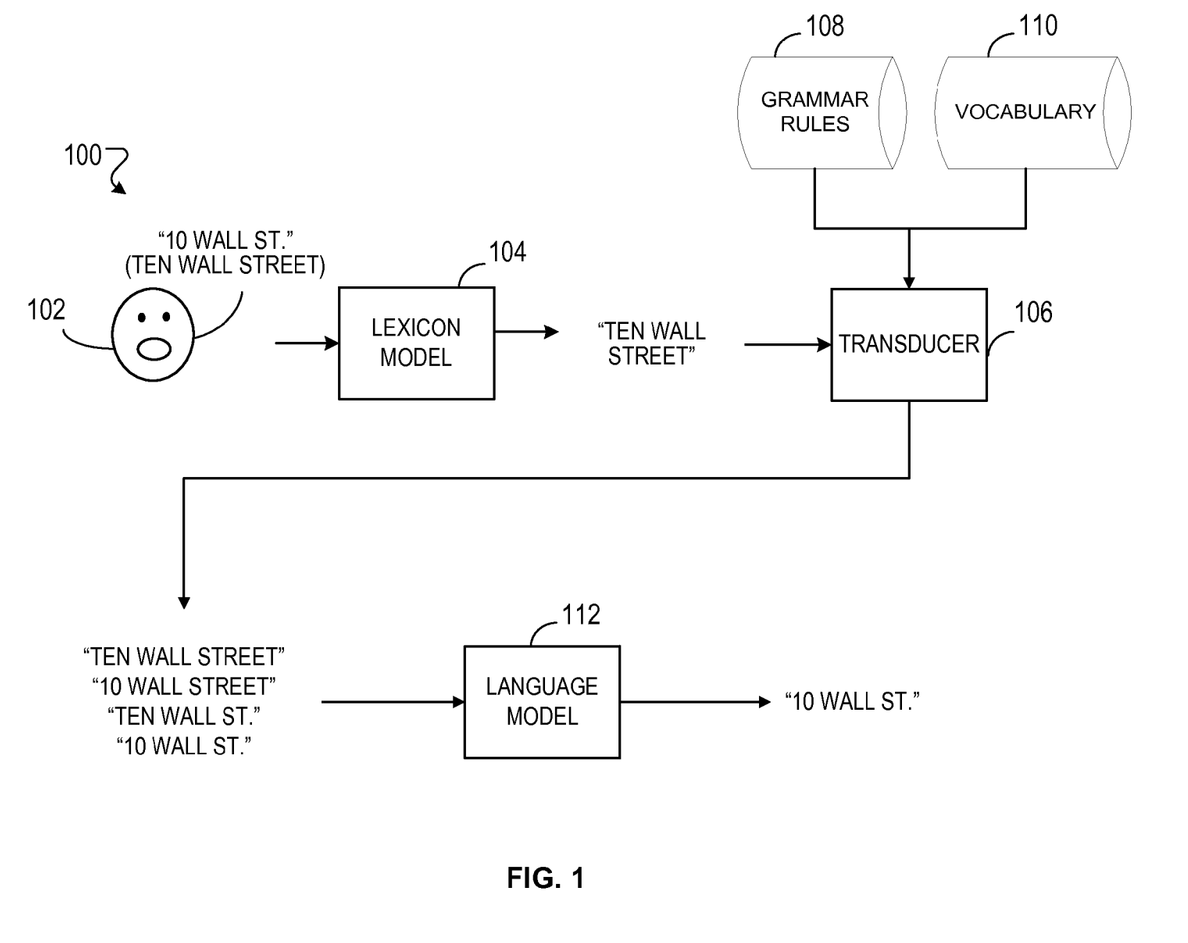
FIG. 1 is a block diagram of an example system for transcribing utterances into written text.

FIG. 1 is a block diagram of an example system 100 for transcribing utterances into written text including lexical and non-lexical items. The system 100 may be used by a user 102 that speaks an utterance. As shown in FIG. 1, a user 102 attempting to input the written text "10 WALL ST." may say "TEN WALL STREET."

The system 100 may include a lexicon model 104 that maps phones to spoken text. The phones may be sub-units of words or units of phonetic speech. For example, the word "WALL" may include the phones "W" and "ALL." The lexicon model 104 may identify phones from the utterances and map the phones into items of spoken text.

The system 100 may include a transducer 106 that maps the written text to spoken text. The transducer may also be referred to as a finite state verbalization model. The transducer may map multiple items of written text to an item of spoken text from the lexicon model 104. For example, the inverse of the transducer 106 may map "TEN WALL STREET" into "TEN WALL STREET," "10 WALL STREET," "TEN WALL ST.," and "10 WALL ST." Items may include one or more words. For example, in the above example, the transducer 106 may map "ST." and "STREET" to "STREET," so the inverse of the transducer 106 may classify the word "STREET" as an item that maps to the items "STREET" and "ST.," or may classify "WALL STREET" as an item that maps to "WALL STREET" and "WALL ST," or may classify "TEN WALL STREET" as an item that maps to "10 WALL ST."

The transducer 106 may be generated based on grammar rules 108 and vocabulary 110. The vocabulary 110 may include all spoken text and written text used in the system 100. The transducer 106 may include expansions of the written text of the vocabulary 110 based on the grammar rules 108. For example, the vocabulary 110 may include the items "10," "TEN," "ONE ZERO," "STREET," and "ST." The grammar rules 108 may specify that "10" may be expanded to "TEN" and "ONE ZERO," and "ST." may be expanded to "STREET". Other grammar rules 108 may include that "ST." may be expanded to "SAINT." These expansions may be added to transducer 106. The grammar rules may be imported from existing text-to-speech systems or speech synthesis systems.

The transducer 106 may also assign weights to certain mappings. For example, a grammar rule for expanding numbers in numeral form into numbers in word form may be assigned a high weight and any mapping based on the grammar rule may be assigned a high weight.

The system 100 may also include a language model 112 that assigns probabilities to written text. The language model 112 may receive the items of written text mapped by the inverse of the transducer 106. The language model 112 may assign probabilities to each item of written text based on the likelihood that the item of written text is a correct transcription. For example, the language model 112 may assign the highest probability of correctness to "10 WALL ST."

The language model 112 may determine the likelihood that each item of written text is a correct transcription based on prior training of the language model 112 using training data of utterances and corresponding written text. For example, the training data may include utterances of "WALL STREET" and the corresponding text of "WALL ST." so that the language model 112 is trained to determine a high likelihood of correctness to "WALL ST." for an utterance of "WALL STREET."

The language model 112 may then select an item of written text for output. The language model 112 may select the item of written text with the highest assigned probability. For example, when "10 WALL ST." has the highest probability, the language model 112 may select "10 WALL ST" for output. When items of written text have associated weights assigned by the transducer 106, the language model 112 may select an item of written text based on the assigned probabilities and the associated weights. For example, the language model may modify the assigned probabilities based on the associated weights.

Different configurations of the system 100 may be used where functionality of the lexicon model 104, the transducer 106, and the language model 112 may be combined, further distributed, or interchanged. The system 100 may be implemented in a single device or distributed across multiple devices.

Figure 2:
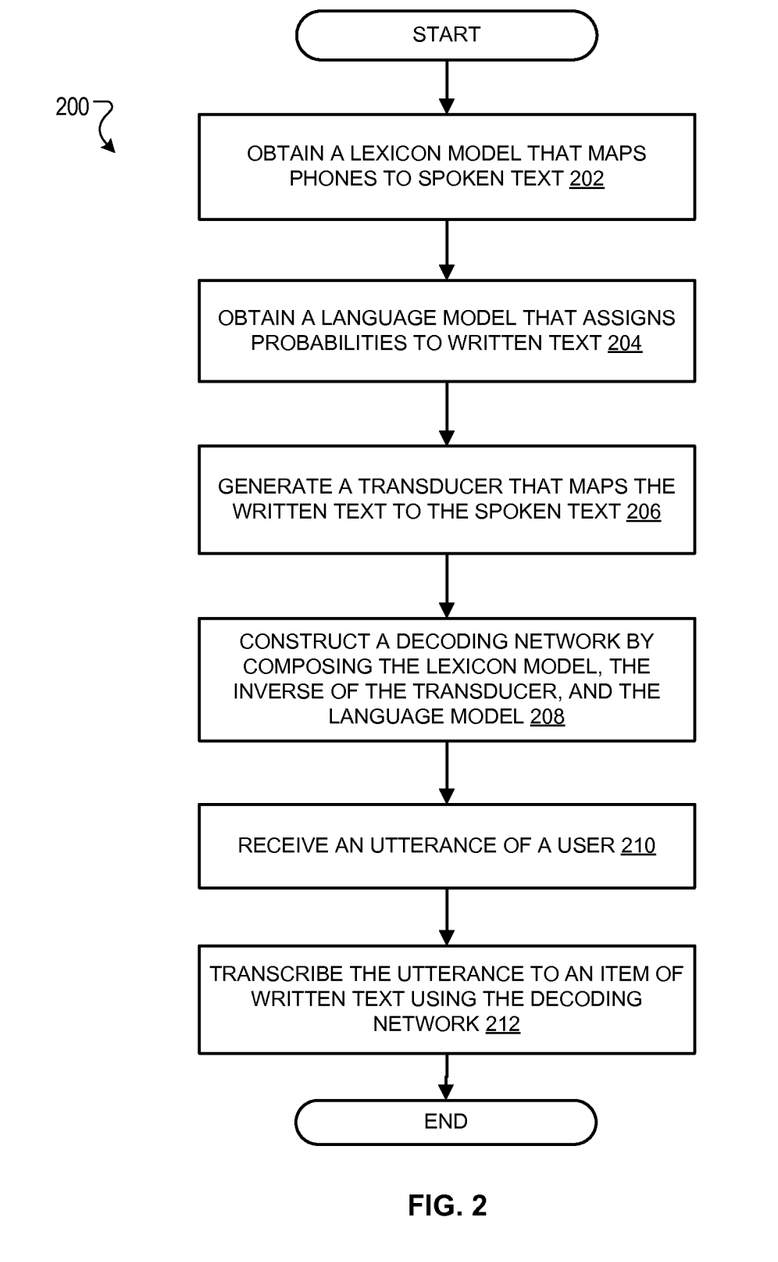
FIG. 2 is a flowchart of an example process for transcribing utterances into written text.

FIG. 2 is a flowchart of an example process 200 for transcribing utterances into written text. The following describes the process 200 as being performed by components of the system 100 that are described with reference to FIG. 1. However, the process 200 may be performed by other systems or system configurations.

The process 200 may include obtaining the lexicon model 104 that maps phones to spoken text (202). Obtaining the lexicon model 104 may include receiving the lexicon model 104 from a data source or generating the lexicon model 104. A data source may be a computer readable storage medium, a data stream, or a database.

For example, the process 200 may include generating the lexicon model 104 by obtaining a context dependency model that maps context dependent phones to context independent phones and obtaining a pronunciation lexicon that maps sequences of the context independent phones to the spoken text. The lexicon model 104 may be generated from the context dependency model and the pronunciation lexicon by composing the context dependency model with the pronunciation lexicon.

The process 200 may include obtaining the language model 112 that assigns probabilities to written text (204). Obtaining the lexicon model may include receiving the language model 112 from a data source or generating the language model 112. For example, the process 200 may include generating the language model 112 from a language model that assigns probabilities to spoken text.

The process 200 may include generating the transducer 106 that maps the written text to the spoken text (206). Generating the transducer 106 may include obtaining the grammar rules 108 and the vocabulary 110. The process 200 may include generating the transducer 106 by expanding the vocabulary 110 using the grammar rules 108 and adding the expansions into the transducer 106.

The process 200 may include constructing a decoding network by composing the lexicon model 104, the inverse of the transducer 106, and the language model 112 (208). A decoding network may be a network for transcribing utterances into written text. For example, the decoding network may represent a finite state network where the input is an utterance and the output is an item of written text.

The process 200 may include obtaining an utterance of the user 102 (210). For example, the process 200 may include obtaining the spoken text of, or an utterance corresponding to spoken text of "TEN WALL STREET." The utterance may be obtained from a data source. The data source may include a voice detection device, e.g., a microphone, that records utterances from the user 102.

A microphone may be any suitable acoustic to electric transducer for converting sound into audio signals, such as unidirectional, bidirectional, or omnidirectional wired or wireless microphones. In other implementations, the voice detection device may include an analog-to-digital converter, a processor, and computer readable storage media. In some implementations, the voice detection device may include one or more user input/output components (e.g., buttons, an LCD, and/or a presence-sensitive display).

The process 200 may include transcribing the utterance to an item of written text using the decoding network (212). For example, the utterance "TEN WALL STREET" may be transcribed into "10 WALL ST." using the decoding network.

Figure 3:
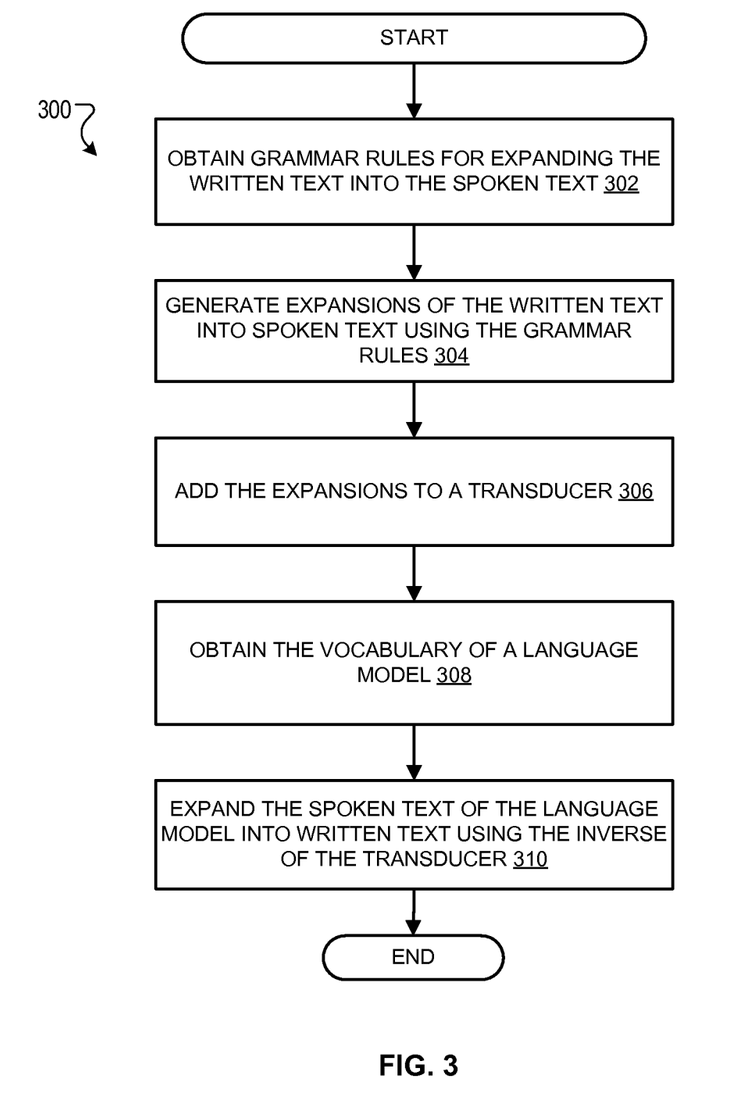
FIG. 3 is a flowchart of an example process for expanding spoken text into written text using a transducer.

FIG. 3 is a flowchart of an example process 300 for expanding spoken text into written text using an inverse of a transducer. The following describes the process 300 as being performed by components of the system 100 that are described with reference to FIG. 1. However, the process 300 may be performed by other systems or system configurations. The process 300 may be used to generate the language model 112 that assigns probabilities to written text from a language model that assigns probabilities to spoken text.

The process 300 may include obtaining grammar rules 108 for expanding the written text into the spoken text (302). For example, as described above, the grammar rules 108 may specify that "10" may be expanded to "TEN" and "ONE ZERO," and "ST." may be expanded to "STREET" and "ST." Other grammar rules 108 may include that "SAINT" may be expanded to "ST."

The process 300 may include generating expansions of the written text into spoken text using the grammar rules (304). For example, expansions may be generated using an algorithm that applies each grammar rule 108 to each item of written text.

The process 300 may include adding the expansions to the transducer 106 (306). The generated expansions may be treated as paths between a start state and a final state where the input label of the path is the spoken text and the output label of the path is the written text. These expansions of written text to spoken text may be added to transducer 106 as mappings between items of written text and items of spoken text.

The process 300 may include obtaining the vocabulary of the language model that assigns probabilities to spoken text (308). For example, the vocabulary of the language model may be received from a data source or determined by analyzing the language model. The vocabulary of the language model may include all the items of spoken text within the language model.

The process 300 may include expanding the spoken text of the language model into written text using the inverse of the transducer 106 (310). Similarly as to how the inverse of the transducer 106 may be used to map spoken text from the lexicon model 104 to written text, the inverse of the transducer 106 may be used to expand the spoken text of the language model by mapping spoken text in the language model to written text. Accordingly, the language model that previously only included spoken text may then include written text.

A detailed example of system 100 follows. It may be desirable for automatic speech recognition (ASR) systems to transcribe verbal language into written text for presentation to the user. Transcription into written text may be difficult for at least the following three reasons. First, lexical and non-lexical items may need to be converted to their pronunciations for phonetic acoustic modeling. Second, the format of the raw output from a decoding network may depend on the choice of vocabulary items used for language modeling. Third, there may be ambiguity in converting between spoken text and written text in both directions. "Spoken" may also be referred to as "verbal." For example, spoken language may also be referred to as verbal language and spoken text may also be referred to as verbal text.

For example, transcribing the following verbal transcript may be an ambiguous task, "ten wall street apartment forty five eighty one new york new york one hundred twenty five."

The conversion of numeric entities to written form may be especially nondeterministic. For instance, the numeric entities may be transcribed into verbal or written text, e.g., "one" versus "1". Also, the proper format may depend on the application domain. For example, some words can be abbreviated or replaced by an acronym depending on the application, e.g., "new york" as "NY." Finally, the correct transcription can also depend on real world knowledge such as the existence of an address in the transcribed format. In this example, "forty five eighty one" may be realized as "4581" or "45 81".

A written text transcription of this utterance for a voice-search-enabled maps application may be as follows, "10 Wall St. Apt. 4581 New York, N.Y. 10025"

To properly transcribe an utterance, a language model may be trained using written text. A finite-state verbalization model may be created and incorporated into the decoding network by composition with the language model. The verbalization model may effectively transform written non-lexical items into written lexical items that can be looked up in a lexicon. The approach may thereby maintain a desired richness of a written language model, together with the simplicity of a verbal-domain lexicon.

Weighted finite-state transducers (WFSTs) are widely used to represent all the components of a speech recognition system. This representation comes together with a composition algorithm that efficiently combines all the components into a single finite-state decoding network. More specifically, in a finite-state transducer based ASR system, a decoding network D is typically constructed by composing the following finite-state models: a context-dependency model C mapping context-dependent phones to context-independent phones, a pronunciation lexicon L mapping context-independent phone sequences to words, and an n-gram language model G assigning probabilities to word sequences.

In the WFST framework, composition may be expressed as $D=C \circ L \circ G$, where $\circ$ is the composition operator. In this setup, the speech decoder handles decoding over the Hidden Markov Model (HMM) states corresponding to context-dependent phones. However, a Hidden Markov Model H mapping HMM state sequences to context-dependent phones may also be incorporated into the decoding network construction, which can be expressed as $D=H \circ C \circ L \circ G$. In the detailed example below, the decoding network does not use a Hidden Markov Model. The implementation may rely on an OpenFst weighted finite-state transducer library.

A verbal expansion of vocabulary items may be incorporated into the construction of the decoding network. Expansion may be incorporated by constructing a finite-state verbalizer transducer V that maps verbal expansion of word sequences to vocabulary items. With this model, the decoding network can be expressed as $D=C \circ L \circ V \circ G$. Verbal expansions may be based on grammar rules used to expand non-lexical items such as numeric entities.

Such grammar rules rely on regular expressions and context-dependent rewrite rules, and are commonly used for text processing and verbal expansion for text-to-speech and speech recognition. Grammar rules can be efficiently compiled into finite-state transducers.

A sample rewrite grammar rule is given below for a small set of vocabulary items. The rewrite rules for numeric entities can be expressed efficiently in compact form due to the regular language nature of these entities, rather than explicitly listing them as in the example, rule=("10": "ten") |("10": "one zero")|("NY": "new york") ("St.": "street")| ("St.": "saint").

Figure 4:
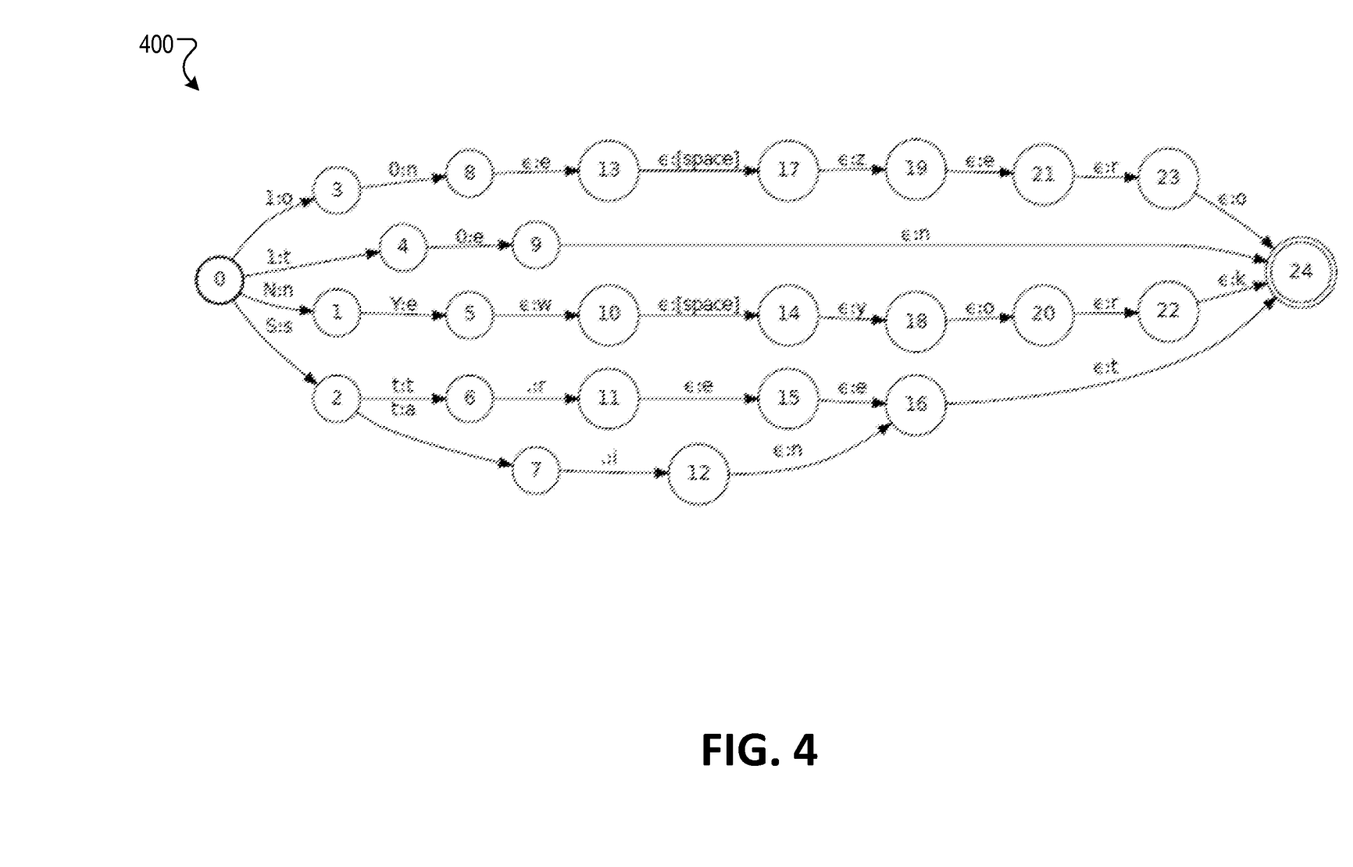
FIG. 4 is a diagram of an example finite-state transducer for a rewrite rule.

FIG. 4 is a diagram of an example finite-state transducer for a rewrite rule. The above example rule may be efficiently compiled to a finite-state transducer representation as shown in FIG. 4 using a rule compiler. Multiple grammar rules to verbalize various classes of vocabulary items are defined and all these rules may be compiled into a set of finite-state transducers.

The set of finite transducers for compiling rewrite grammar rules may be input into an algorithm for constructing a finite-state transducer for a verbalizer. An example process is shown below in Table 1:

TABLE 1

```
V ← vocabulary of language model
R ← set of finite-state transducers for rewrite grammar rules
for all v ∈ V do
    W ← ∅
    for all r ∈ R do
        w ← rewrite(v, r)
        if w is not empty string then
            insert w into W
        end if
    end for
    if W is ∅ then
        W ← v
    end if
    for all w ∈ W do
        add a path w → v to VFST
    end for
end for
V_FST ← closure(determinize(VFST))
```

The process takes as input the vocabulary of the language model and the set of finite-state transducers for the compiled rewrite grammar rules. The process enumerates all the vocabulary items and tries to rewrite each vocabulary item using each rewrite grammar rule transducer. The process accumulates these verbal expansions in a set. If there is no rule that applies to a vocabulary item, the item itself is inserted in the set of verbal expansions. For example, lexical vocabulary items for which the lexicon can directly produce pronunciation alternatives may generally not have applicable rules. To construct the verbalizer transducer using all possible verbal expansions for each vocabulary item, paths from the start state to the final state of the verbalizer transducer with each verbal expansion for each vocabulary item on the input label and that vocabulary item on the output label may be added to the verbalizer transducer.

Figure 5:
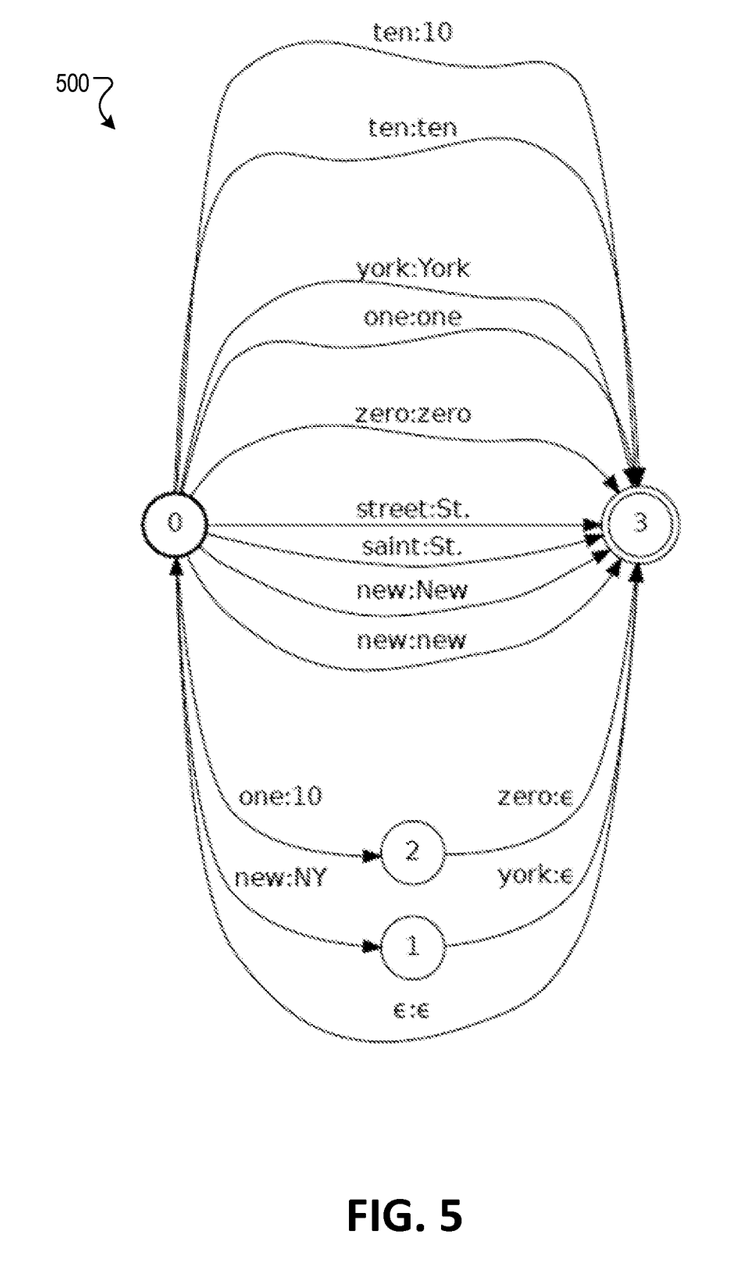
FIG. 5 is a diagram of an example finite-state transducer for expanding spoken text.

FIG. 5 is a diagram of an example finite-state transducer for expanding spoken text. The input labels are in verbal domain and the output labels are in the written domain of the language model.

Verbal expansions of vocabulary items may not be context-dependent. Accordingly, a parallel corpus of sentences in written and verbal language may be needed to train a context-dependent verbalization model. A context-dependent verbalization model may also require model smoothing to generalize verbalization over unseen instances, especially for numeric entities. The verbalizer can also be used to normalize capitalization for the lexicon if capitalization is retained in the language model. Finally, it is also possible to assign weights to the rewrite rules and in the verbalizer model to discriminate between verbalization alternates. As seen in this example, the verbalizer model may be non-deterministic in both input and output labels.

A generalized composition algorithm may be used to compose the verbalizer transducer V with the language model G. The algorithm may allow efficient composition by avoiding the creation of useless output-epsilon paths while also optimizing the composed model by pushing forward labels and weights for runtime efficiency. The resulting verbalized language model may be used with dynamic, runtime, composition in the decoder. The model may also be statically composed with the context-dependent lexicon to build a static decoding network.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
    obtaining a lexicon model that maps phones to spoken text, wherein spoken text includes only words that are spelled out;
    obtaining a language model that assigns probabilities to written text, wherein written text includes (i) words that are spelled out and (ii) sequences of characters that include abbreviations that are not spelled out words, acronyms that are not spelled out words, and numeric symbols;
    obtaining grammar rules for expanding written text into spoken text;
    generating, using the grammar rules, expansions of written text that includes sequences of characters that include abbreviations that are not spelled out words, acronyms that are not spelled out words, and numeric symbols into spoken text that includes only words that are spelled out, the expansions including mappings of multiple different items of written text to a particular item of the spoken text;
    generating a transducer that includes the expansions, where the transducer maps the written text to the spoken text, the transducer mapping the multiple different items of written text to the particular item of the spoken text;
    constructing a decoding network for transcribing utterances into written text, by composing the lexicon model, the inverse of the transducer, and the language model; and
    generating, by an automated speech recognizer, a transcription of a subsequently received utterance into written text using the decoding network.

2. The method of claim 1, further comprising:
    obtaining an utterance of a user; and
    transcribing the utterance to an item of the written text using the decoding network.

3. The method of claim 1, wherein the spoken text comprises a textual representation of a spoken language.

4. The method of claim 1, wherein the written text comprises a textual representation of a written language.

5. The method of claim 1, wherein obtaining the grammar rules comprises:
    obtaining the grammar rules from a text-to-speech system.

6. The method of claim 1, wherein obtaining the language model comprises
    obtaining spoken text of the language model;
    generating written text from the spoken text of the language model using the inverse of the transducer; and
    adding the generated written text to the language model.

7. The method of claim 1, where obtaining the lexicon model comprises
    obtaining a context dependency model mapping context dependent phones to context independent phones;
    obtaining a pronunciation lexicon mapping sequences of the context independent phones to the spoken text; and
    constructing the lexicon model by composing the context dependency model and the pronunciation lexicon.

8. The method of claim 1, wherein words that are spelled out comprise lexical items.

9. The method of claim 1, wherein the sequences of characters that represent words, but that are not, spelled out words comprise non-lexical items.

10. The method of claim 1, wherein the transducer maps the multiple different items of written text that includes (i) words that are spelled out and (ii) sequences of characters that include abbreviations that are not spelled out words, acronyms that are not spelled out words, and numeric symbols into the particular item of the spoken text that includes only words that are spelled out.

11. A system comprising:
    one or more computers and one or more storage devices storing instructions that are operable, when executed by the one or more computers, to cause the one or more computers to perform operations comprising:
    obtaining a lexicon model that maps phones to spoken text, wherein spoken text includes only words that are spelled out;
    obtaining a language model that assigns probabilities to written text, wherein written text includes (i) words that are spelled out and (ii) sequences of characters that include abbreviations that are not spelled out words, acronyms that are not spelled out words, and numeric symbols;
    obtaining grammar rules for expanding written text into spoken text;
    generating, using the grammar rules, expansions of written text that includes sequences of characters that include abbreviations that are not spelled out words, acronyms that are not spelled out words, and numeric symbols into spoken text that includes only words that are spelled out, the expansions including mappings of multiple different items of written text to a particular item of the spoken text;
    generating a transducer that includes the expansions, where the transducer maps the written text to the spoken text, the transducer mapping the multiple different items of written text to the particular item of the spoken text;
    constructing a decoding network for transcribing utterances into written text, by composing the lexicon model, the inverse of the transducer, and the language model; and
    generating, by an automated speech recognizer, a transcription of a subsequently received utterance into written text using the decoding network.

12. The system of claim 11, wherein the operations further comprise:
    obtaining an utterance of a user; and
    transcribing the utterance to an item of the written text using the decoding network.

13. The system of claim 11, wherein the spoken text comprises a textual representation of a spoken language.

14. The system of claim 11, wherein the written text comprises a textual representation of a written language.

15. The system of claim 11, wherein obtaining the grammar rules comprises:
    obtaining the grammar rules from a text-to-speech system.

16. The system of claim 11, wherein obtaining the language model comprises
    obtaining spoken text of the language model;
    generating written text from the spoken text of the language model using the inverse of the transducer; and
    adding the generated written text to the language model.

17. The system of claim 11, where obtaining the lexicon model comprises
    obtaining a context dependency model mapping context dependent phones to context independent phones;

obtaining a pronunciation lexicon mapping sequences of the context independent phones to the spoken text; and constructing the lexicon model by composing the context dependency model and the pronunciation lexicon.

18. A non-transitory computer-readable medium storing software comprising instructions executable by one or more computers which, upon such execution, cause the one or more computers to perform operations comprising:

obtaining a lexicon model that maps phones to spoken text, wherein spoken text includes only words that are spelled out;

obtaining a language model that assigns probabilities to written text, wherein written text includes (i) words that are spelled out and (ii) sequences of characters that include abbreviations that are not spelled out words, acronyms that are not spelled out words, and numeric symbols;

obtaining grammar rules for expanding written text into spoken text;

generating, using the grammar rules, expansions of written text that includes sequences of characters that include abbreviations that are not spelled out words, acronyms that are not spelled out words, and numeric symbols into spoken text that includes only words that are spelled out, the expansions including mappings of multiple different items of written text to a particular item of the spoken text;

generating a transducer that includes the expansions, where the transducer maps the written text to the spoken text, the transducer mapping the multiple different items of written text to the particular item of the spoken text;

constructing a decoding network for transcribing utterances into written text, by composing the lexicon model, the inverse of the transducer, and the language model; and generating, by an automated speech recognizer, a transcription of a subsequently received utterance into written text using the decoding network.

19. The system of claim 18, wherein the operations further comprise:

obtaining an utterance of a user; and transcribing the utterance to an item of the written text using the decoding network.

20. The system of claim 18, wherein the spoken text comprises a textual representation of a spoken language.

\* \* \* \* \*